(12) United States Patent
Petrzilek et al.

(10) Patent No.: US 10,381,165 B2
(45) Date of Patent: Aug. 13, 2019

(54) SOLID ELECTROLYTIC CAPACITOR FOR USE AT HIGH TEMPERATURES

(71) Applicant: AVX Corporation, Fountain Inn, SC (US)

(72) Inventors: Jan Petrzilek, Usti nad Orlici (CZ); Martin Biler, Lanskroun (CZ)

(73) Assignee: AVX Corporation, Fountain Inn, SC (US)

(*) Notice: Subject to any disclaimer, the term of this patent is extended or adjusted under 35 U.S.C. 154(b) by 140 days.

(21) Appl. No.: 15/159,887

(22) Filed: May 20, 2016

(65) Prior Publication Data

US 2017/0338046 A1 Nov. 23, 2017

(51) Int. Cl.
| | |
|---|---|
| *H01G 9/025* | (2006.01) |
| *H01G 9/022* | (2006.01) |
| *H01G 9/052* | (2006.01) |
| *H01G 9/032* | (2006.01) |
| *H01G 9/042* | (2006.01) |
| *H01G 9/00* | (2006.01) |
| *H01G 9/07* | (2006.01) |
| *H01G 9/15* | (2006.01) |

(52) U.S. Cl.
CPC ........... *H01G 9/042* (2013.01); *H01G 9/0029* (2013.01); *H01G 9/032* (2013.01); *H01G 9/052* (2013.01); *H01G 9/07* (2013.01); *H01G 9/15* (2013.01)

(58) Field of Classification Search
CPC .......... H01G 9/15; H01G 9/025; H01G 9/022; H01G 9/032; H01G 9/042; H01G 9/0029; H10G 9/052

USPC ................................ 361/523, 502, 525, 532
See application file for complete search history.

(56) References Cited

U.S. PATENT DOCUMENTS

| | | |
|---|---|---|
| 3,628,103 A | 12/1971 | Booe |
| 4,780,796 A | 10/1988 | Fukuda et al. |
| 4,945,452 A | 7/1990 | Sturmer et al. |
| 5,111,327 A | 5/1992 | Blohm et al. |
| 5,457,862 A | 10/1995 | Sakata et al. |
| 5,473,503 A | 12/1995 | Sakata et al. |
| 5,729,428 A | 3/1998 | Sakata et al. |
| 5,812,367 A | 9/1998 | Kudoh et al. |
| 6,197,252 B1 | 3/2001 | Bishop et al. |
| 6,324,051 B1 | 11/2001 | Igaki et al. |
| 6,635,729 B1 | 10/2003 | Groenendaal et al. |

(Continued)

FOREIGN PATENT DOCUMENTS

| | | |
|---|---|---|
| EP | 1 863 044 A1 | 12/2007 |
| EP | 1 100 097 B1 | 8/2008 |
| JP | 2007227465 A | 9/2007 |

OTHER PUBLICATIONS

Henkel Corporation, Technical Data Sheet—Loctite Ablestik SSP 2020, Dec. 2012, 2 pages.

(Continued)

*Primary Examiner* — Eric W Thomas
*Assistant Examiner* — Arun Ramaswamy
(74) *Attorney, Agent, or Firm* — Dority & Manning, P.A.

(57) ABSTRACT

A capacitor that comprises a capacitor element that includes an anode that contains a dielectric formed on a sintered porous body, a solid electrolyte overlying the anode, and a cathode coating is provided. The cathode coating includes a noble metal layer (e.g., gold) overlying the solid electrolyte and a layer overlying the noble metal layer that includes sintered metal particles (e.g., silver particles).

25 Claims, 4 Drawing Sheets

(56) References Cited

U.S. PATENT DOCUMENTS

| | | |
|---|---|---|
| 6,671,167 B2 | 12/2003 | Araki et al. |
| 6,674,635 B1 | 1/2004 | Fife et al. |
| 6,798,665 B2 | 9/2004 | Kimura |
| 6,845,004 B2 | 1/2005 | Melody et al. |
| 6,965,508 B2 | 11/2005 | Takatani et al. |
| 6,987,663 B2 | 1/2006 | Merker et al. |
| 7,152,429 B2 | 12/2006 | Paradowski |
| 7,262,511 B2 | 8/2007 | Osako et al. |
| 7,515,396 B2 | 4/2009 | Biler |
| 8,125,768 B2 | 2/2012 | Horacek et al. |
| 8,203,827 B2 | 6/2012 | Karnik |
| 8,896,985 B2 | 11/2014 | Chacko et al. |
| 8,896,986 B2 | 11/2014 | Chacko et al. |
| 8,902,565 B2 | 12/2014 | McConnell et al. |
| 9,190,217 B2 | 11/2015 | Snyder et al. |
| 9,236,192 B2 | 1/2016 | Biler et al. |
| 9,236,193 B2 | 1/2016 | Tatsuno et al. |
| 9,275,798 B2 | 3/2016 | Momo et al. |
| 9,293,263 B2 | 3/2016 | Liu et al. |
| 9,748,043 B2 | 8/2017 | Chacko et al. |
| 9,779,874 B2 | 10/2017 | McConnell et al. |
| 9,793,057 B2 | 10/2017 | McConnell et al. |
| 9,881,774 B2 | 1/2018 | Frantz et al. |
| 2007/0171596 A1 | 7/2007 | Chacko et al. |
| 2008/0123251 A1 | 5/2008 | Randall et al. |
| 2009/0161299 A1* | 6/2009 | Nemoto ............... H01G 9/0425 361/532 |
| 2009/0195968 A1 | 8/2009 | Naito |
| 2012/0257328 A1* | 10/2012 | Zednicek ............... H01G 9/012 361/528 |
| 2016/0104580 A1 | 4/2016 | Maeshima et al. |
| 2018/0137987 A1 | 5/2018 | Vilc et al. |
| 2018/0137988 A1 | 5/2018 | Vilc et al. |

OTHER PUBLICATIONS

Technical Data Sheet for Hysol® MG33F-0588, Electronic Grade Epoxy Molding Compound, Loctite, Henkel, May 2000, 2 pages.
Technical Data Sheet for GR2310™, Hysol®, Henkel, Jun. 2009, 2 pages.
Technical Data Sheet for Loctite Hysol GR 2811, Henkel, Jul. 2012, 2 pages.
Material Safety Data Sheet according to (EC) No. 1907/2006 for Loctite Hysol CG6077 GR2811, Henkel, Jun. 28, 2013, 8 pages.
International Search Report and Written Opinion for PCT/US2017/032583 dated Aug. 17, 2017, 10 pages.

\* cited by examiner

SOLID ELECTROLYTIC CAPACITOR FOR USE AT HIGH TEMPERATURES

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte (e.g., manganese dioxide) and a cathode coating that contains a carbon layer and silver resin layer. One problem associated with many conventional solid electrolytic capacitors, however, is that they are relatively sensitive to high temperatures. For example, at temperatures of 230° C. or higher, it is believed that contaminant gases (e.g., carbon dioxide, carbon monoxide, etc.) can be generated from the carbon-based binders used in the cathode coating. As such, a need currently exists for a capacitor that has improved performance at high temperatures.

SUMMARY OF THE INVENTION

In accordance with one embodiment of the present invention, a capacitor is disclosed that comprises a capacitor element that includes an anode that contains a dielectric formed on a sintered porous body, a solid electrolyte overlying the anode, and a cathode coating. The cathode coating includes a noble metal layer (e.g., gold) overlying the solid electrolyte and a layer overlying the noble metal layer that includes sintered metal particles (e.g., silver particles). In accordance with another embodiment of the present invention, a method for forming a capacitor is disclosed that comprises forming a noble metal layer over a solid electrolyte, applying a paste over the noble metal layer that contains metal particles, and sintering the metal particles to form a sintered metal particle layer.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor that is capable of exhibiting good properties at high temperatures. The ability to perform under such conditions is due in part to the use of a unique cathode coating that overlies the solid electrolyte of the capacitor. More particularly, the cathode coating contains a noble metal layer, which typically includes a noble metal having a relatively high electric potential (e.g., gold). The cathode coating also contains a sintered metal particle layer that overlies the noble metal layer. The sintered particle layer may act as a solderable conductor, contact layer, and/or charge collector for the capacitor. Further, it is believed that the use of sintered particles can remain mechanically stable at high temperatures, thereby minimizing the risk of detachment from the noble metal layer, which could have an adverse impact on electrical performance.

Consequently, the resulting capacitor may exhibit excellent electrical properties even when exposed to high temperatures. For example, the capacitor may be placed into contact with an atmosphere having a temperature of from about 150° C. or more, in some embodiments about 200° C. or more, and in some embodiments, from about 220° C. to about 350° C. (e.g., 230° C.). Even at such high temperatures, the capacitance may be about 30 nanoFarads per square centimeter ("$nF/cm^2$") or more, in some embodiments about 100 $nF/cm^2$ or more, and in some embodiments, from about 200 to about 30,000 $nF/cm^2$, determined at a frequency of 120 Hz. The capacitor may also exhibit a relatively low equivalence series resistance ("ESR"), such as about 500 mohms or less, in some embodiments less than about 250 mohms, and in some embodiments, from about 0.1 to about 200 mohms, determined at a frequency of 100 kHz. The dissipation factor of the capacitor may also be maintained at relatively low levels. The dissipation factor generally refers to losses that occur in the capacitor and is usually expressed as a percentage of the ideal capacitor performance. For example, the dissipation factor of the capacitor of the present invention is typically from about 1% to about 25%, in some embodiments from about 3% to about 10%, and in some embodiments, from about 5% to about 15%, as determined at a frequency of 120 Hz. Notably, these values (e.g., capacitance, ESR, and dissipation factor) can also remain stable at such temperatures for a substantial period of time, such as for about 100 hours or more, in some embodiments from about 300 hours to about 3000 hours, and in some embodiments, from about 400 hours to about 2500 hours (e.g., about 500 hours). In one embodiment, for example, the ratio of the capacitance value of the capacitor after being exposed to the hot atmosphere (e.g., 230° C.) for about 500 hours to the respective capacitance value of the capacitor when initially exposed to the hot atmosphere may be from about 0.7 to 1.0, in some embodiments from about 0.75 to 1.0, and in some embodiments, from about 0.80 to 1.0.

Various embodiments of the capacitor will now be described in more detail.

I. Capacitor Element

A. Anode Body

The capacitor element includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluotantalate ($K_2TaF_7$), sodium fluotantalate (Na$_2$TaF$_7$), tantalum pentachloride (TaCl$_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., TaCl$_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 800,000 microFarads*Volts per gram ("μF*V/g") depending on the desired application. For instance, in certain embodiments, a high charge powder may be employed that has a specific charge of from about 100,000 to about 800,000 μF*V/g, in some embodiments from about 120,000 to about 700,000 μF*V/g, and in some embodiments, from about 150,000 to about 600,000 μF*V/g. In other embodiments, a low charge powder may be employed that has a specific charge of from about 2,000 to about 100,000 μF*V/g, in some embodiments from about 5,000 to about 80,000 μF*V/g, and in some embodiments, from about 10,000 to about 70,000 μF*V/g. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass.

The pellet is typically sintered at a temperature of from about 700° C. to about 1600° C., in some embodiments from about 800° C. to about 1500° C., and in some embodiments, from about 900° C. to about 1200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide (Ta$_2$O$_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

A solid electrolyte overlies the dielectric and generally functions as the cathode for the capacitor element. Typically, the total thickness of the solid electrolyte is from about 1 to about 50 μm, and in some embodiments, from about 5 to about 20 μm. In some embodiments, the solid electrolyte may include a manganese dioxide. If the solid electrolyte includes manganese dioxide, the manganese dioxide solid electrolyte may, for instance, be formed by the pyrolytic decomposition of manganese nitrate ($Mn(NO_3)_2$). Such techniques are described, for instance, in U.S. Pat. No. 4,945,452 to Sturmer, et al. The solid electrolyte may also contain a conductive polymer, which is typically π-conjugated and has electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxythiophene is available from Heraeus Clevios under the designation Clevios ™ M. Other suitable monomers are also described in U.S. Pat. Nos. 5,111,327 to Blohm, et al. and 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Various methods may be utilized to form the conductive polymer layer. For example, an in situ polymerized layer may be formed by chemically polymerizing monomers in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron(III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios ™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. Nos. 5,457,862 to Sakata, et al., 5,473,503 to Sakata, et al., 5,729,428 to Sakata, et al., and 5,812,367 to Kudoh, et al.

In addition to in situ application, the conductive polymer solid electrolyte may also be applied in the form of a dispersion of conductive polymer particles. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization. In addition to conductive polymer(s) and counterion(s), the dispersion may also contain one or more binders, dispersion agents, fillers, adhesives, crosslinking agents, etc.

D. Cathode Coating i. Noble Metal Layer

As noted above, a cathode coating is also employed in the capacitor element that contains at least one noble metal layer that overlies the solid electrolyte. The noble metal layer typically contains a noble metal having a relatively high electric potential as measured against a standard hydrogen electrode. For example, the noble metal may have an electrical potential of about 0.7 V or more, in some embodiments about 1.0 V or more, and in some embodiments, from about 1.2 to about 2.0 V. Examples of such noble metals include, for instance, gold (electric potential of 1.6 V), platinum (electric potential of 1.2 V), iridium (electric potential of 1.2 V), palladium (electric potential of 1.0 V), and so forth. Typically, only one noble metal layer is employed, although it should be understood that multiple layers may be employed if so desired. The total thickness of the noble metal layer(s) is typically within the range of from about 0.1 µm to about 50 µm, in some embodiments from about 1 µm to about 30 µm, and in some embodiments, from about 2 µm to about 10 µm. The noble metal layer(s) are also generally continuous in nature to minimize contact of the solid electrolyte with any other materials. Any of a variety of known techniques may generally be employed to apply a noble metal layer. Suitable methods may include, for instance, sputtering, electrolytic plating, vapor deposition, electroless plating, etc., such as described in U.S. Pat. Nos. 4,780,797 to Libby and 3,628,103 to Booe.

ii. Sintered Metal Particle Layer

The cathode coating also contains a sintered particle layer that overlies the noble metal layer. The sintered metal particle layer generally contains a conductive metal, such as copper, nickel, silver, nickel, zinc, tin, lead, copper, aluminum, molybdenum, titanium, iron, zirconium, magnesium, and alloys thereof. Silver is a particularly suitable conductive metal for use in the layer. Typically, only one sintered particle layer is employed, although it should be understood that multiple layers may be employed if so desired. The total thickness of such layer(s) is typically within the range of from about 1 µm to about 500 µm, in some embodiments from about 5 µm to about 200 µm, and in some embodiments, from about 10 µm to about 100 µm.

The sintered particle layer is typically formed from a paste that contains metal particles of a relatively small size, such as an average size of from about 0.01 to about 50 micrometers, in some embodiments from about 0.1 to about 40 micrometers, and in some embodiments, from about 1 to about 30 micrometers. Due to in part to the relatively small size of the particles, the paste may have a relatively low viscosity, allowing it to be readily handled and applied to an anode lead and/or anode component during manufacture of the capacitor. The viscosity may, for instance, range from about 5 to about 250 Pascal-seconds (Pa-s), in some embodiments from about 20 Pa-s to about 200 Pa-s, and in some embodiments, from about 30 Pa-s to about 150 Pa-s, as measured with a Brookfield DV-1 viscometer (cone and plate) operating at a speed of 5 or 0.5 rpm and a temperature of 25° C. If desired, thickeners or other viscosity modifiers may be employed in the paste to increase or decrease viscosity. Further, the thickness of the applied paste may also be relatively thin and still achieve the desired binding of the lead to the anode component. For example, the thickness of the paste may be from about 0.01 to about 50 micrometers, in some embodiments from about 0.5 to about 30 micrometers, and in some embodiments, from about 1 to about 25 micrometers.

The metal particles used in the paste may be constituted primarily by a metal or from a composition that contains a metal as a component. Suitable metal particles may, for instance, be formed from ruthenium, rhodium, palladium, silver, osmium, iridium, platinum, gold, tantalum, niobium, aluminum, nickel, hafnium, titanium, copper, etc., as well as alloys thereof. Desirably, the metal particles are formed from a material that is the same or substantially similar in nature to the noble metal employed in the noble metal layer so that a strong bond will form between the particles and the noble metal layer when sintered. Examples of suitable noble metals for use in forming the sintered particle layer include ruthenium, rhodium, palladium, silver, osmium, iridium, platinum, and gold. Silver is particularly suitable. Typically, the metal particles constitute from about 50 wt. % to about 99 wt. %, in some embodiments from about 60 wt. % to about 95 wt. %, and in some embodiments, from about 70 wt. % to about 90 wt. % of the paste.

To form the paste, the particles may be initially dispersed in a solvent. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth.

In addition to the metal particles, the paste may also include other ingredients to aid in application of the layer and/or in the sintering process, such as binders, sintering aids, dispersants, wetting agents, plasticizers, and so forth. For example, a sintering aid may be employed that is a metallic compound, such as an organometallic compound, metal-organic salt, metal mercaptan, metal resinate, etc. Desirably, the sintering aid includes the same metal as the metal particles. For instance, when silver particles are employed, the sintering aid may be a silver mercaptan (e.g., silver t-dodecylmercaptan or silver diethyldithiocarbamate), organosilver compound (e.g., bis-(η1-4-phenyl-η2-1-butene)silver(I)), organic silver salt (e.g., silver (I) hexafuoropentane-dionatecyclooctadiane complex, silver neodecanoate, silver 2,4-pentafluoropropionate, silver 2,4-pentanedionate, silver tosylate, etc.), and so forth. Suitable binders may likewise include, for instance, epoxy compounds (e.g., two-component UHU epoxy adhesive); poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); silicon polymers, such as poly(methyl siloxane), poly(methylphenyl siloxane); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; and acrylic polymers, such as sodium polyacrylate, poly(lower alkyl acrylates), poly(lower alkyl methacrylates) and copolymers of lower alkyl acrylates and methacrylates.

Any of a variety of techniques may generally be employed to apply the metal paste over the noble metal layer, such as heat treating, thermal sintering, sputtering, screen-printing, dipping, electrophoretic coating, electron beam deposition, spraying, roller pressing, brushing, doctor blade casting, vacuum deposition, coating, etc. Once applied, the metal paste may be optionally dried to remove any various components, such as solvents. For instance, drying may occur at a temperature of from about 20° C. to about 150° C., in some embodiments from about 50° C. to about 140° C., and in some embodiments, from about 80° C. to about 130° C. The paste is thereafter sintered so that the particles can form a bond with each other and/or the noble metal layer. The temperature at sintering occurs may vary, but is typically from about 150° C. to about 500° C., in some embodiments from about 180° C. to about 350° C., and in some embodiments from about 200° C. to about 300° C. Sintering may also occur at any desired pressure. In certain embodiments, for example, sintering may occur under pressure, such as a pressure of from about 1 Megapascal (MPa) to about 50 MPa, in some embodiments from about 2 to about 30 MPa, and in some embodiments, from about 5 to about 25 MPa. The total time of sintering may vary depending on the temperature and pressure employed, but typically ranges from about 1 minute to about 350 minutes, in some embodiments from about 50 to about 300 minutes, and in some embodiments, from about 80 minutes to about 250 minutes. The atmosphere used during sintering may also vary. In certain embodiments, for example, sintering may occur in an inert atmosphere (e.g., nitrogen, etc.), an oxidizing atmosphere (e.g., air or oxygen), or a reducing atmosphere (e.g., hydrogen).

E. Other Components

If desired, the capacitor element may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1 \times 10^5$ Ω·cm, and in some embodiments, greater than about $1 \times 10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

II. Terminations

Once formed, the capacitor element may be provided with terminations, particularly when employed in surface mounting applications. For example, the capacitor may contain an anode termination to which an anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the electrolytic capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor element is adequately adhered to the cathode termination.

III. Housing

Due to the ability of the capacitor to exhibit good electrical performance at high temperatures, it is not necessary for the capacitor element to be hermetically sealed within a housing. Nevertheless, in certain embodiments, it may be desired to hermetically seal the capacitor element within a housing. In one embodiment, for example, the capacitor element may be hermetically sealed within a housing in the presence of a gaseous atmosphere that contains an inert gas.

The capacitor element may be sealed within a housing in various ways. In certain embodiments, for instance, the capacitor element may be enclosed within a case, which may then be filled with a resinous material, such as a thermoset resin (e.g., epoxy resin) that can be cured to form a hardened housing. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof. Regardless, the resinous material may surround and encapsulate the capacitor element so that at least a portion of the anode and cathode terminations are exposed for mounting onto a circuit board. When encapsulated in this manner, the capacitor element and resinous material form an integral capacitor.

Of course, in alternative embodiments, it may be desirable to enclose the capacitor element within a housing that remains separate and distinct. In this manner, the atmosphere of the housing can possess a certain degree of moisture such that it is considered a humid atmosphere. For example, the relative humidity of the atmosphere may be about 40% or more, in some embodiments about 45% or more, and in some embodiments, from about 50% to about 95% (e.g., about 50%). In alternative embodiments, however, the atmosphere may be relatively dry so that it has a relative humidity of less than about 40%, in some embodiments about 30% or less, in some embodiments about 10% or less, and in some embodiments, from about 0.001 to about 5%. For example, the atmosphere may be gaseous and contain at least one inert gas, such as nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing.

Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

Figure 1:
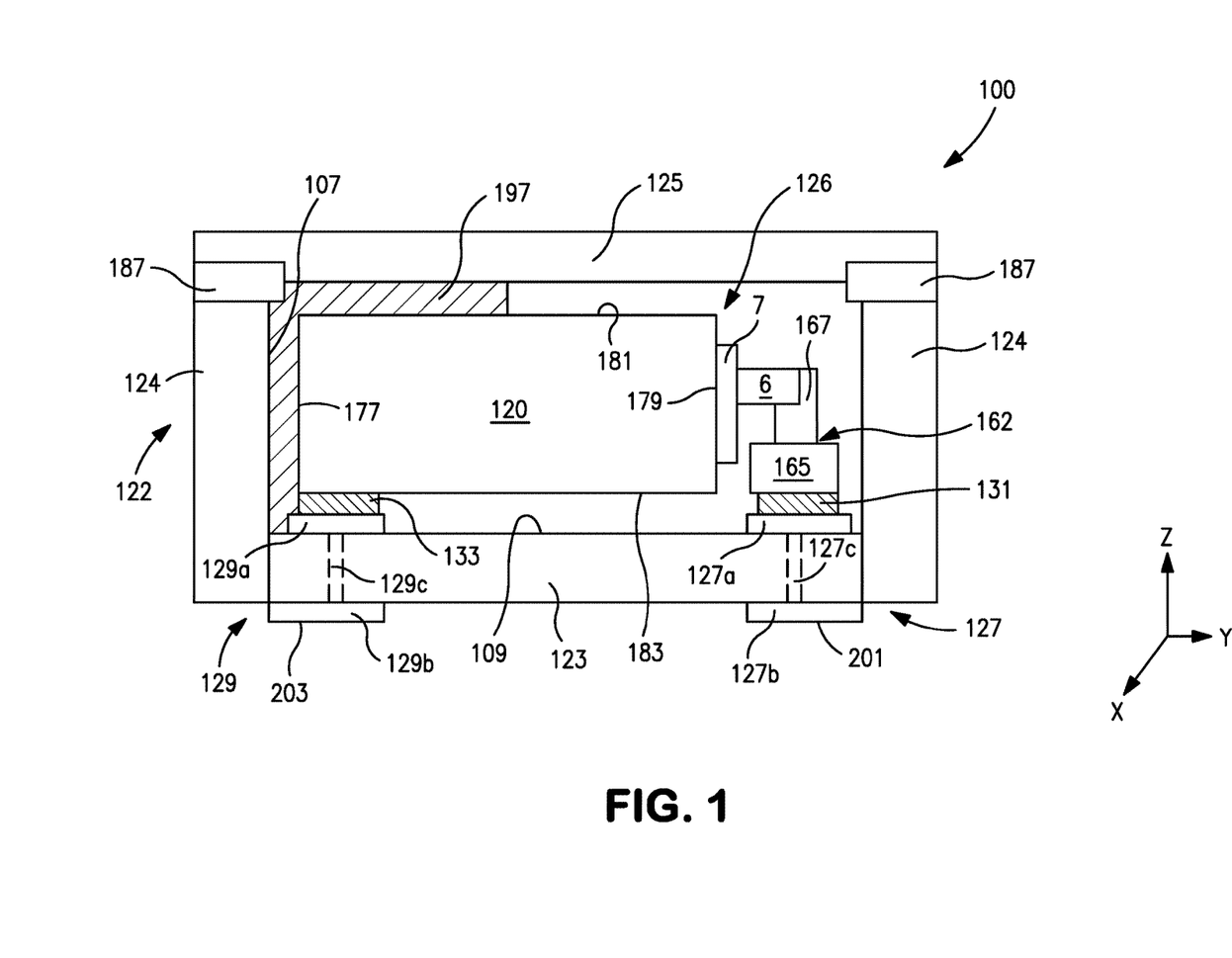
FIG. 1 is a cross-sectional view of one embodiment of a capacitor of the present invention.

The housing may have any desired shape, such as cylindrical, D-shaped, rectangular, triangular, prismatic, etc. Referring to FIG. 1, for example, one embodiment of a capacitor 100 is shown that contains a housing 122 and a capacitor element 120. In this particular embodiment, the housing 122 is generally rectangular. Typically, the housing and the capacitor element have the same or similar shape so that the capacitor element can be readily accommodated within the interior cavity. In the illustrated embodiment, for example, both the capacitor element 120 and the housing 122 have a generally rectangular shape.

If desired, the capacitor of the present invention may exhibit a relatively high volumetric efficiency. To facilitate such high efficiency, the capacitor element typically occupies a substantial portion of the volume of an interior cavity of the housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior cavity of the housing. To this end, the difference between the dimensions of the capacitor element and those of the interior cavity defined by the housing are typically relatively small.

Referring to FIG. 1, for example, the capacitor element 120 may have a length (excluding the length of the anode lead 6) that is relatively similar to the length of an interior cavity 126 defined by the housing 122. For example, the ratio of the length of the anode to the length of the interior cavity ranges from about 0.40 to 1.00, in some embodiments from about 0.50 to about 0.99, in some embodiments from about 0.60 to about 0.99, and in some embodiments, from about 0.70 to about 0.98. The capacitor element 120 may have a length of from about 5 to about 10 millimeters, and the interior cavity 126 may have a length of from about 6 to about 15 millimeters. Similarly, the ratio of the height of the capacitor element 120 (in the -z direction) to the height of the interior cavity 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the -x direction) to the width of the interior cavity 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior cavity 126 may be from about 3 to about 10 millimeters, and the height of the capacitor element 120 may be from about 0.5 to about 2 millimeters and the width of the interior cavity 126 may be from about 0.7 to about 6 millimeters.

Although by no means required, the capacitor element may be attached to the housing in such a manner that an anode termination and cathode termination are formed external to the housing for subsequent integration into a circuit. The particular configuration of the terminations may depend on the intended application. In one embodiment, for example, the capacitor may be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor.

In certain embodiments, connective members may be employed within the interior cavity of the housing to facilitate connection to the terminations in a mechanically stable manner. For example, referring again to FIG. 1, the capacitor 100 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a lateral direction in which the lead 6 extends (e.g., -y direction). The first portion 167 is "upstanding" in the sense that it is provided in a plane that is generally perpendicular the lateral direction in which the lead 6 extends. In this manner, the first portion 167 can limit movement of the lead 6 in the horizontal direction to enhance surface contact and mechanical stability during use. If desired, an insulative material 7 (e.g., Teflon ™ washer) may be employed around the lead 6.

The first portion 167 may possess a mounting region (not shown) that is connected to the anode lead 6. The region may have a "U-shape" for further enhancing surface contact and mechanical stability of the lead 6. Connection of the region to the lead 6 may be accomplished using any of a variety of known techniques, such as welding, laser welding, conductive adhesives, etc. In one particular embodiment, for example, the region is laser welded to the anode lead 6. Regardless of the technique chosen, however, the first portion 167 can hold the anode lead 6 in substantial horizontal alignment to further enhance the dimensional stability of the capacitor 100.

Referring again to FIG. 1, one embodiment of the present invention is shown in which the connective member 162 and capacitor element 120 are connected to the housing 122 through anode and cathode terminations 127 and 129, respectively. More specifically, the housing 122 of this embodiment includes an outer wall 123 and two opposing sidewalls 124 between which a cavity 126 is formed that includes the capacitor element 120. The outer wall 123 and sidewalls 124 may be formed from one or more layers of a metal, plastic, or ceramic material such as described above. In this particular embodiment, the anode termination 127 contains a first region 127a that is positioned within the housing 122 and electrically connected to the connection member 162 and a second region 127b that is positioned external to the housing 122 and provides a mounting surface 201. Likewise, the cathode termination 129 contains a first region 129a that is positioned within the housing 122 and electrically connected to the solid electrolyte of the capacitor element 120 and a second region 129b that is positioned external to the housing 122 and provides a mounting surface 203. It should be understood that the entire portion of such regions need not be positioned within or external to the housing.

In the illustrated embodiment, a conductive trace 127c extends in the outer wall 123 of the housing to connect the first region 127a and second region 127b. Similarly, a conductive trace 129c extends in the outer wall 123 of the housing to connect the first region 127a and second region 127b. The conductive traces and/or regions of the terminations may be separate or integral. In addition to extending through the outer wall of the housing, the traces may also be positioned at other locations, such as external to the outer wall. Of course, the present invention is by no means limited to the use of conductive traces for forming the desired terminations.

Regardless of the particular configuration employed, connection of the terminations 127 and 129 to the capacitor element 120 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129.

Optionally, a polymeric restraint may also be disposed in contact with one or more surfaces of the capacitor element, such as the rear surface, front surface, upper surface, lower surface, side surface(s), or any combination thereof. The polymeric restraint can reduce the likelihood of delamination by the capacitor element from the housing. In this regard, the polymeric restraint may possesses a certain degree of strength that allows it to retain the capacitor element in a relatively fixed positioned even when it is subjected to vibrational forces, yet is not so strong that it cracks. For example, the restraint may possess a tensile strength of from about 1 to about 150 MPa, in some embodiments from about 2 to about 100 MPa, in some embodiments from about 10 to about 80 MPa, and in some embodiments, from about 20 to about 70 MPa, measured at a temperature of about 25° C. It is normally desired that the restraint is not electrically conductive. Referring again to FIG. 1, for instance, one embodiment is shown in which a single polymeric restraint 197 is disposed in contact with an upper surface 181 and rear surface 177 of the capacitor element 120. While a single restraint is shown in FIG. 1, it should be understood that separate restraints may be employed to accomplish the same function. In fact, more generally, any number of polymeric restraints may be employed to contact any desired surface of the capacitor element. When multiple restraints are employed, they may be in contact with each other or remain physically separated. For example, in one embodiment, a second polymeric restraint (not shown) may be employed that contacts the upper surface 181 and front surface 179 of the capacitor element 120. The first polymeric restraint 197 and the second polymeric restraint (not shown) may or may not be in contact with each other. In yet another embodiment, a polymeric restraint may also contact a lower surface 183 and/or side surface(s) of the capacitor element 120, either in conjunction with or in lieu of other surfaces.

Regardless of how it is applied, it is typically desired that the polymeric restraint is also in contact with at least one surface of the housing to help further mechanically stabilize the capacitor element against possible delamination. For example, the restraint may be in contact with an interior surface of one or more sidewall(s), outer wall, lid, etc. In FIG. 1, for example, the polymeric restraint 197 is in contact with an interior surface 107 of sidewall 124 and an interior surface 109 of outer wall 123. While in contact with the housing, it is nevertheless desired that at least a portion of the cavity defined by the housing remains unoccupied to allow for the inert gas to flow through the cavity and limit contact of the solid electrolyte with oxygen. For example, at least about 5% of the cavity volume typically remains unoccupied by the capacitor element and polymer restraint, and in some embodiments, from about 10% to about 50% of the cavity volume.

Once connected in the desired manner, the resulting package is hermetically sealed as described above. Referring again to FIG. 1, for instance, the housing 122 may also include a lid 125 that is placed on an upper surface of side walls 124 after the capacitor element 120 and the polymer restraint 197 are positioned within the housing 122. The lid 125 may be formed from a ceramic, metal (e.g., iron, copper, nickel, cobalt, etc., as well as alloys thereof), plastic, and so forth. If desired, a sealing member 187 may be disposed between the lid 125 and the side walls 124 to help provide a good seal. In one embodiment, for example, the sealing member may include a glass-to-metal seal, Kovar® ring (Goodfellow Camridge, Ltd.), etc. The height of the side walls 124 is generally such that the lid 125 does not contact any surface of the capacitor element 120 so that it is not contaminated. The polymeric restraint 197 may or may not contact the lid 125. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting capacitor is substantially free of reactive gases, such as oxygen.

Figure 2:
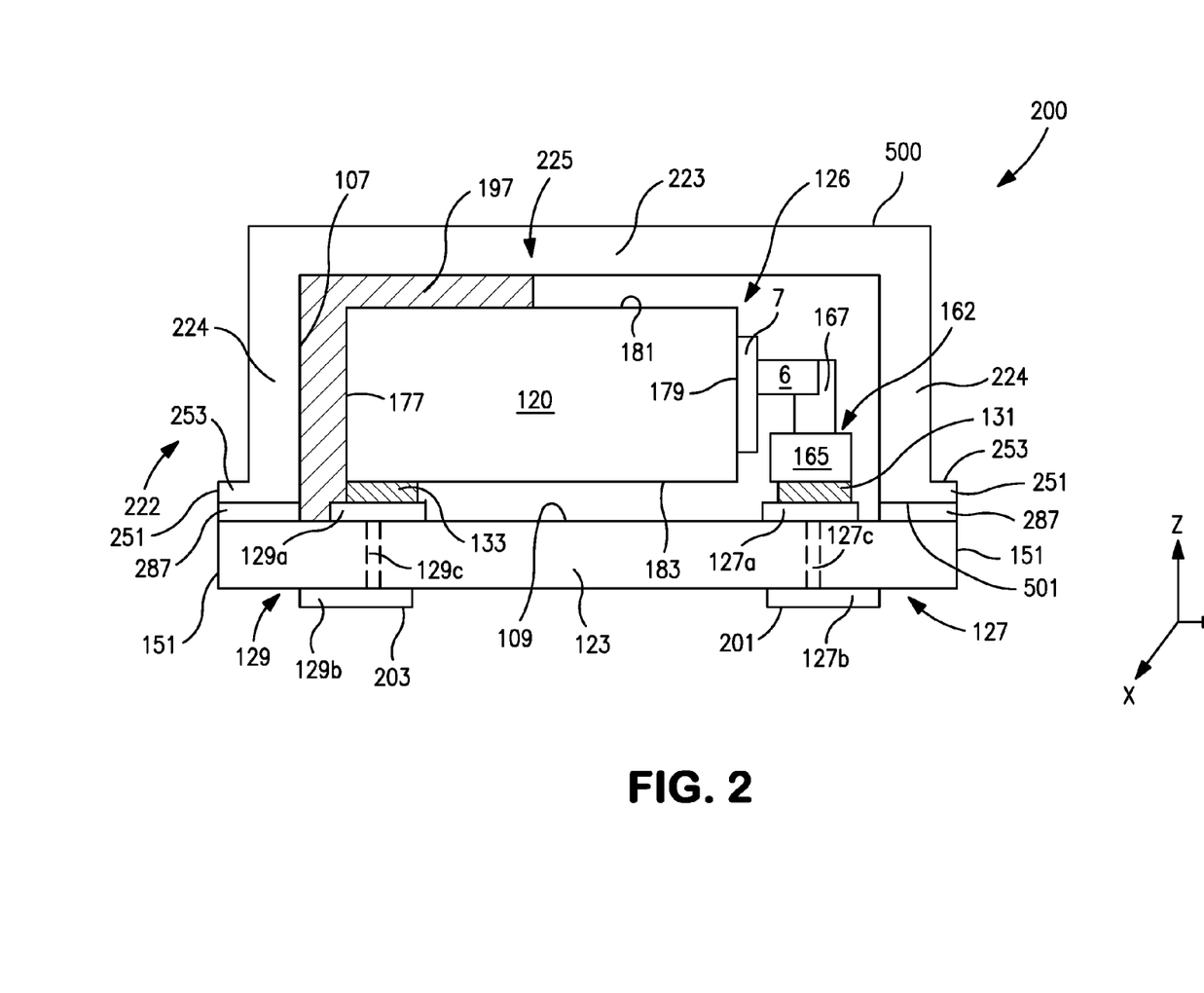
FIG. 2 is a cross-sectional view of another embodiment of a capacitor of the present invention.

It should be understood that the embodiments described are only exemplary, and that various other configurations may be employed in the present invention for hermetically sealing a capacitor element within a housing. Referring to FIG. 2, for instance, another embodiment of a capacitor 200 is shown that employs a housing 222 that includes an outer wall 123 and a lid 225 between which a cavity 126 is formed that includes the capacitor element 120 and polymeric restraint 197. The lid 225 includes an outer wall 223 that is integral with at least one sidewall 224. In the illustrated embodiment, for example, two opposing sidewalls 224 are shown in cross-section. The outer walls 223 and 123 both extend in a lateral direction (-y direction) and are generally parallel with each other and to the lateral direction of the anode lead 6. The sidewall 224 extends from the outer wall 223 in a longitudinal direction that is generally perpendicular to the outer wall 123. A distal end 500 of the lid 225 is defined by the outer wall 223 and a proximal end 501 is defined by a lip 253 of the sidewall 224.

The lip 253 extends from the sidewall 224 in the lateral direction, which may be generally parallel to the lateral direction of the outer wall 123. The angle between the sidewall 224 and the lip 253 may vary, but is typically from about 60° to about 120°, in some embodiments from about 70° to about 110°, and in some embodiments, from about 80° to about 100° (e.g., about 90°). The lip 253 also defines a peripheral edge 251, which may be generally perpendicular to the lateral direction in which the lip 253 and outer wall 123 extend. The peripheral edge 251 is located beyond the outer periphery of the sidewall 224 and may be generally coplanar with an edge 151 of the outer wall 123. The lip 253 may be sealed to the outer wall 123 using any known technique, such as welding (e.g., resistance or laser), soldering, glue, etc. For example, in the illustrated embodiment, a sealing member 287 is employed (e.g., glass-to-metal seal, Kovar® ring, etc.) between the components to facilitate their attachment. Regardless, the use of a lip described above can enable a more stable connection between the components and improve the seal and mechanical stability of the capacitor.

Figure 3:
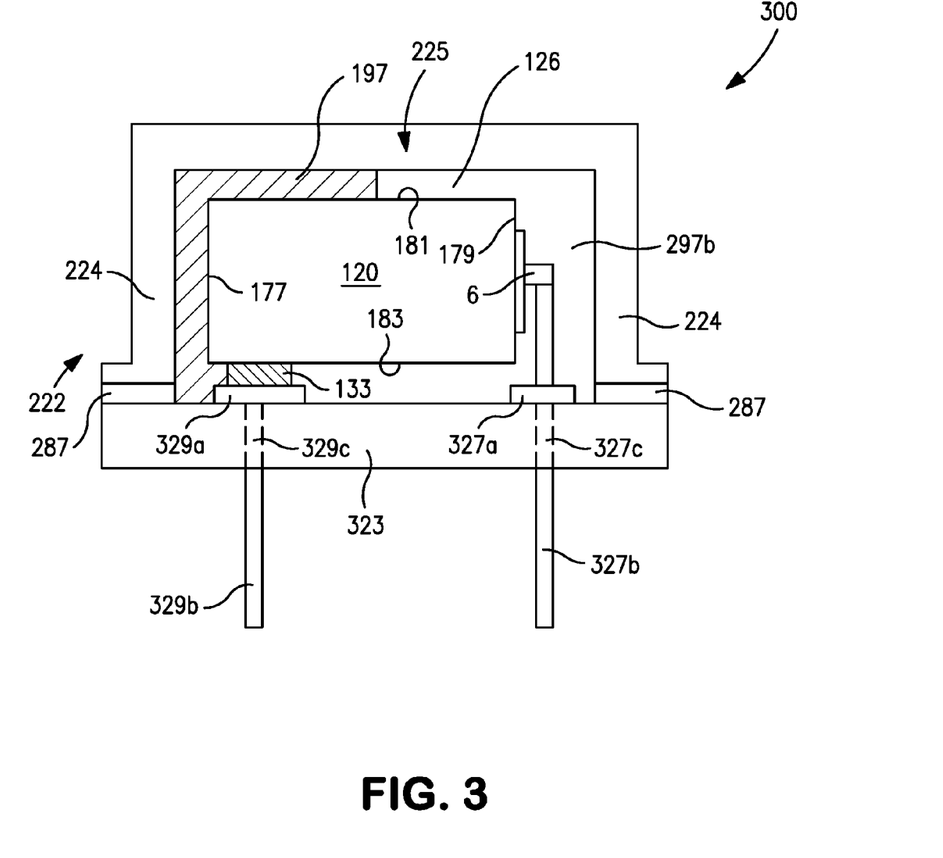
FIG. 3 is a cross-sectional view of yet another embodiment of a capacitor of the present invention.

Still other possible housing configurations may be employed in the present invention. For example, FIG. 3 shows a capacitor 300 having a housing configuration similar to that of FIG. 2, except that terminal pins 327b and 329b are employed as the external terminations for the anode and cathode, respectively. More particularly, the terminal pin 327a extends through a trace 327c formed in the outer wall 323 and is connected to the anode lead 6 using known techniques (e.g., welding). An additional section 327a may be employed to secure the pin 327b. Likewise, the terminal pin 329b extends through a trace 329c formed in the outer wall 323 and is connected to the cathode via a conductive adhesive 133 as described above.

Figure 4:
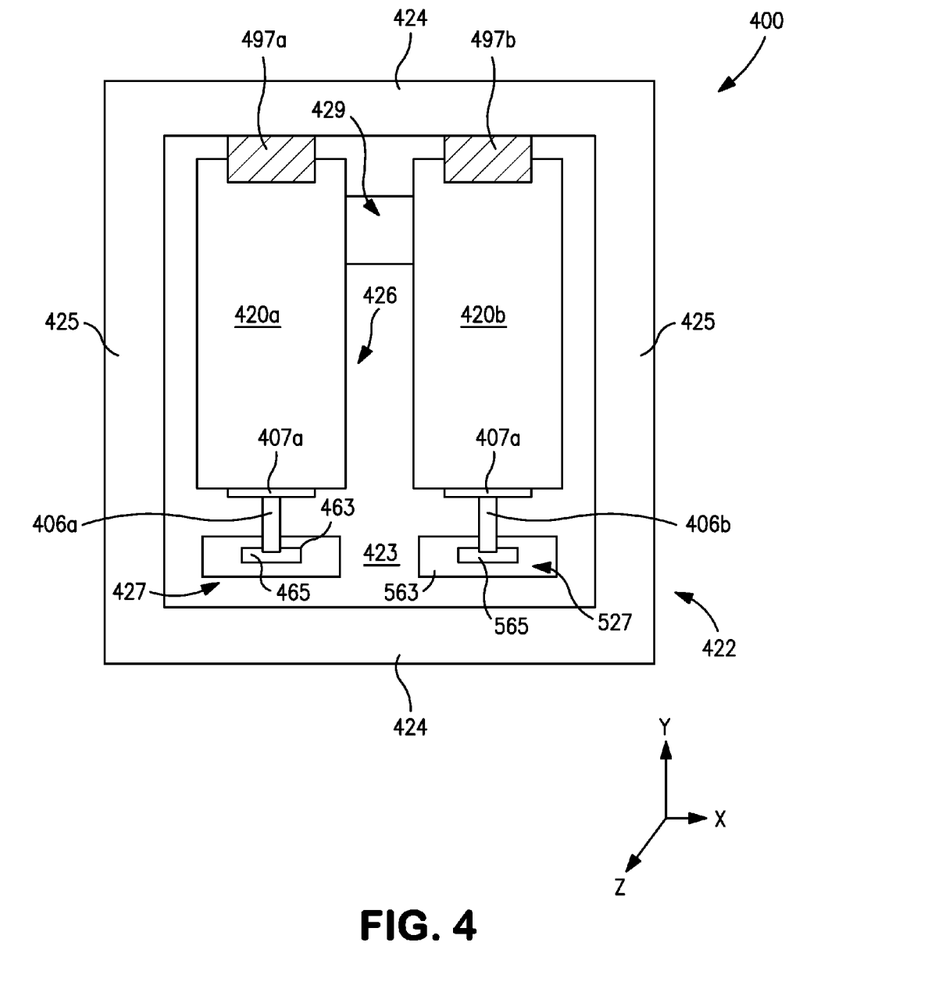
FIG. 4 is a top view of still another embodiment of a capacitor of the present invention.

The embodiments shown in FIGS. 1-3 are discussed herein in terms of only a single capacitor element. It should also be understood, however, that multiple capacitor elements may also be hermetically sealed within a housing. The multiple capacitor elements may be attached to the housing using any of a variety of different techniques. Referring to FIG. 4, for example one particular embodiment of a capacitor 400 that contains two capacitor elements is shown and will now be described in more detail. More particularly, the capacitor 400 includes a first capacitor element 420a in electrical communication with a second capacitor element 420b. In this embodiment, the capacitor elements are aligned so that their major surfaces are in a horizontal configuration. That is, a major surface of the capacitor element 420a defined by its width (-x direction) and length (-y direction) is positioned adjacent to a corresponding major surface of the capacitor element 420b. Thus, the major surfaces are generally coplanar. Alternatively, the capacitor elements may be arranged so that their major surfaces are not coplanar, but perpendicular to each other in a certain direction, such as the -z direction or the -x direction. Of course, the capacitor elements need not extend in the same direction.

The capacitor elements 420a and 420b are positioned within a housing 422 that contains an outer wall 423 and sidewalls 424 and 425 that together define a cavity 426. Although not shown, a lid may be employed that covers the upper surfaces of the sidewalls 424 and 425 and seals the capacitor 400 as described above. Optionally, a polymeric restraint may also be employed to help limit the vibration of the capacitor elements. In FIG. 4, for example, separate polymer restraints 497a and 497b are positioned adjacent to and in contact with the capacitor elements 420a and 420b, respectively. The polymer restraints 497a and 497b may be positioned in a variety of different locations. Further, one of the restraints may be eliminated, or additional restraints may be employed. In certain embodiments, for example, it may be desired to employ a polymeric restraint between the capacitor elements to further improve mechanical stability.

In addition to the capacitor elements, the capacitor also contains an anode termination to which anode leads of respective capacitor elements are electrically connected and a cathode termination to which the cathodes of respective capacitor elements are electrically connected. Referring again to FIG. 4, for example, the capacitor elements are shown connected in parallel to a common cathode termination 429. In this particular embodiment, the cathode termination 429 is initially provided in a plane that is generally parallel to the bottom surface of the capacitor elements and may be in electrical contact with conductive traces (not shown). The capacitor 400 also includes connective members 427 and 527 that are connected to anode leads 407a and 407b, respectively, of the capacitor elements 420a and 420b. More particularly, the connective member 427 contains an upstanding portion 465 and a planar portion 463 that is in connection with an anode termination (not shown). Likewise, the connective 527 contains an upstanding portion 565 and a planar portion 563 that is in connection with an anode termination (not shown). Of course, it should be understood that a wide variety of other types of connection mechanisms may also be employed.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may 100 kHz and the temperature may be 23° C.±2° C.

Capacitance (CAP)

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Temperature Life Testing

The capacitors have been stored under life conditions 230° C./0.5 Ur and 250° C./0.5 Ur and tested for electrical performance (i.e., ESR, and CAP conducted at 25° C.).

EXAMPLE 1

A tantalum anode (5.35 mm×3.70 mm×1.00 mm) was anodized at 115V in a liquid electrolyte to 10 µF. A conductive coating was then formed by dipping the entire anode into an aqueous solution of manganese(II) nitrate and then decomposed at 250° C. The part was coated with gold using Baltec sputter coater. A copper-based leadframe material was used to finish the assembly process. The tantalum wire of the capacitor element was then laser welded to an anode connective member. The cathode connective member was then glued with the silver adhesive to a gold cathode termination and the anode connective member was then welded to a gold anode termination located inside a ceramic housing having a length of 11.00 mm, a width of 6.00 mm, and a thickness of 2.20 mm. The adhesive used in that case for the connections was a silver filled epoxy paste (EPO-Tek E3035). The adhesive was applied only between the leadframe portion and gold plated solder pad and was dried at 250° C. for 60 minutes. The resulting assembly was placed into a welding chamber and purged with nitrogen gas before seam welding between the seal ring and the lid was performed. Multiple parts (20) of 10 µF/35V rated capacitors in ceramic case were made in this manner.

EXAMPLE 2

Capacitors were formed in the manner described in Example 1, except that a paste that contains sintered silver particles was used as the silver adhesive in the assembly process (Loctite SSP2020). Multiple parts (20) of 10 µF/35V rated capacitors in ceramic case were made in this manner.

EXAMPLE 3

Capacitors were formed in the manner described in Example 1, except that a paste that contains sintered silver particles was used as the silver adhesive in the assembly process (Heraeus ASP295). Multiple parts (20) of 10 µF/35V rated capacitors in ceramic case were made in this manner.

The finished capacitors of Examples 1-3 were then tested for electrical performance under life conditions 230° C./0.5 Ur. The median results of CAP and ESR are set forth below in Table 1.

TABLE 1

| | Electrical Properties | | | | | | | |
|---|---|---|---|---|---|---|---|---|
| | Cap [µF] | | | | ESR [mohms] | | | |
| | 0 h | 25 h | 250 h | 500 h | 0 h | 25 h | 250 h | 500 h |
| Example 1 | 11.15 | 6.41 | — | — | 917 | 1630 | — | — |
| Example 2 | 10.86 | 10.84 | 10.75 | 10.51 | 348 | 355 | 390 | 455 |
| Example 3 | 10.97 | 10.92 | 10.23 | 6.4 | 408 | 440 | 590 | 1220 |

EXAMPLE 4

A tantalum anode (5.35 mm×3.70 mm×1.00 mm) was anodized at 115V in a liquid electrolyte to 10 µF. A conductive coating was then formed by dipping the entire anode into an aqueous solution of manganese(II) nitrate and then decomposed at 250° C. The part was coated with graphite and silver. A copper-based leadframe material was used to finish the assembly process. The tantalum wire of the capacitor element was then laser welded to an anode connective member. The cathode connective member was then glued with the silver adhesive to a gold cathode termination and the anode connective member was then welded to a gold anode termination located inside a ceramic housing having a length of 11.00 mm, a width of 6.00 mm, and a thickness of 2.20 mm. The adhesive used in that case for the connections was a silver filled epoxy paste (EPO-Tek E3035). The adhesive was applied only between the leadframe portion and gold plated solder pad and was dried at 250° C. for 60 minutes. The resulting assembly was placed into a welding chamber and purged with nitrogen gas before seam welding between the seal ring and the lid was performed. Multiple parts (20) of 10 µF/35V rated capacitors in ceramic case were made in this manner.

EXAMPLE 5

Capacitors were formed in the manner described in Example 4, except that a paste that contains sintered silver particles was used as the silver adhesive in the assembly process (Loctite SSP2020). Multiple parts (20) of 10 µF/35V rated capacitors in ceramic case were made in this manner.

EXAMPLE 6

Capacitors were formed in the manner described in Example 4, except that a paste that contains sintered silver particles was used as the silver adhesive in the assembly process (Heraeus ASP295). Multiple parts (20) of 10 µF/35V rated capacitors in ceramic case were made in this manner.

The finished capacitors of Examples 4-6 were then tested for electrical performance under life conditions 250° C./0.5 Ur. The median results of CAP and ESR are set forth below in Table 2.

TABLE 2

| | Electrical Properties | | | | | | | |
|---|---|---|---|---|---|---|---|---|
| | Cap [µF] | | | | ESR [mohms] | | | |
| | 0 h | 25 h | 250 h | 500 h | 0 h | 25 h | 250 h | 500 h |
| Example 4 | 12.02 | 11.77 | 11.65 | 11.42 | 106 | 109 | 226 | 488 |
| Example 5 | 11.76 | 11.69 | 11.54 | 11.54 | 106 | 106 | 133 | 178 |
| Example 6 | 11.78 | 11.71 | 11.63 | 11.63 | 112 | 114 | 131 | 163 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor comprising a capacitor element that includes an anode that contains a dielectric formed on a sintered porous body, a solid electrolyte overlying the anode, and a cathode coating that includes a noble metal layer overlying the solid electrolyte and a layer overlying the noble metal layer that includes sintered metal particles; and wherein the capacitor exhibits a capacitance of about 30 nanoFarads per square centimeter or more and /or a dissipation factor of from about 1% to about 25%.

2. The capacitor of claim 1, wherein the noble metal layer contains a noble metal having an electrical potential of about 0.7 V or more.

3. The capacitor of claim 1, wherein the noble metal layer includes gold.

4. The capacitor of claim 1, wherein the sintered metal particles include silver.

5. The capacitor of claim 1, wherein the particles have an average size of from about 0.01 to about 50 micrometers.

6. The capacitor of claim 1, wherein the anode body includes tantalum.

7. The capacitor of claim 1, wherein the solid electrolyte includes manganese dioxide.

8. The capacitor of claim 1, wherein the capacitor exhibits an equivalence series resistance of about 500 mohms or less.

9. The capacitor of claim 8, wherein the capacitor exhibits a capacitance of about 30 nanoFarads per square centimeter or more, an equivalence series resistance of about 500 mohms or less, and/or a dissipation factor of from about 1% to about 25%, after being exposed to a temperature of 230° C. for about 500 hours.

10. The capacitor of claim 1, further comprising a housing within which the capacitor element is enclosed.

11. The capacitor of claim 10, wherein the housing is formed from a resinous material that encapsulates the capacitor element.

12. The capacitor of claim 10, wherein the housing defines an interior cavity within which the capacitor element is positioned, wherein the interior cavity has a gaseous atmosphere.

13. The capacitor of claim 12, wherein the gaseous atmosphere contains an inert gas.

14. A capacitor comprising a capacitor element that includes an anode that contains a dielectric formed on a sintered porous body, a solid electrolyte overlying the anode, and a cathode coating that includes a noble metal layer overlying the solid electrolyte and a layer overlying the noble metal layer that includes sintered metal particles; and wherein the solid electrolyte includes manganese dioxide.

15. The capacitor of claim 14, wherein the noble metal layer contains a noble metal having an electrical potential of about 0.7 V or more.

16. The capacitor of claim 14, wherein the noble metal layer includes gold.

17. The capacitor of claim 14, wherein the sintered metal particles include silver.

18. The capacitor of claim 14, wherein the particles have an average size of from about 0.01 to about 50 micrometers.

19. The capacitor of claim 14, wherein the anode body includes tantalum.

20. The capacitor of claim 14, wherein the capacitor exhibits a capacitance of about 30 nanoFarads per square centimeter or more, an equivalence series resistance of about 500 mohms or less, and/or a dissipation factor of from about 1% to about 25%.

21. The capacitor of claim 20, wherein the capacitor exhibits a capacitance of about 30 nanoFarads per square centimeter or more, an equivalence series resistance of about 500 mohms or less, and/or a dissipation factor of from about 1% to about 25%, after being exposed to a temperature of 230° C. for about 500 hours.

22. The capacitor of claim 14, further comprising a housing within which the capacitor element is enclosed.

23. The capacitor of claim 22, wherein the housing is formed from a resinous material that encapsulates the capacitor element.

24. The capacitor of claim 22, wherein the housing defines an interior cavity within which the capacitor element is positioned, wherein the interior cavity has a gaseous atmosphere.

25. The capacitor of claim 24, wherein the gaseous atmosphere contains an inert gas.

* * * * *